(12) United States Patent
Lee

(10) Patent No.: US 10,006,983 B2
(45) Date of Patent: Jun. 26, 2018

(54) APPARATUS AND METHOD FOR DETECTING AZIMUTHAL ANGLE OF HEAT SOURCE

(71) Applicant: Everspring Industry Co., Ltd., New Taipei (TW)

(72) Inventor: Tzong-Sheng Lee, Miao-Li County (TW)

(73) Assignee: EVERSPRING INDUSTRY CO., LTD., New Taipei (TW)

( * ) Notice: Subject to any disclaimer, the term of this patent is extended or adjusted under 35 U.S.C. 154(b) by 264 days.

(21) Appl. No.: 14/918,625

(22) Filed: Oct. 21, 2015

(65) Prior Publication Data

US 2017/0115115 A1  Apr. 27, 2017

(51) Int. Cl.
*G01S 3/78* (2006.01)
*G01S 3/789* (2006.01)

(52) U.S. Cl.
CPC .................................. *G01S 3/789* (2013.01)

(58) Field of Classification Search
CPC .... G01J 5/08; G01J 5/0806; G01J 2005/0077; G01B 11/026; G01S 3/789
USPC .......................... 250/340, 338.3, 342, DIG. 1
See application file for complete search history.

(56) References Cited

U.S. PATENT DOCUMENTS

| | | | | |
|---|---|---|---|---|
| 4,283,368 A * | 8/1981 | Harada | ................. | F01N 3/2846 422/181 |
| 4,358,760 A * | 11/1982 | Palmer | ................... | G08B 17/06 220/4.21 |
| 4,772,875 A * | 9/1988 | Maddox | .................. | G06T 9/008 180/167 |
| 5,311,024 A * | 5/1994 | Marman | .............. | G08B 13/193 250/342 |
| 5,565,683 A * | 10/1996 | Ando | ...................... | G01S 3/784 250/338.3 |
| 5,587,583 A * | 12/1996 | Chin | ...................... | G02B 23/12 250/332 |
| 5,877,688 A * | 3/1999 | Morinaka | ............. | G01S 7/4813 250/338.1 |
| 2004/0031274 A1* | 2/2004 | Cho | ........................ | F25D 29/00 62/126 |

(Continued)

FOREIGN PATENT DOCUMENTS

CN          104280123 A   *   1/2015

*Primary Examiner* — David Porta
*Assistant Examiner* — Blake Riddick
(74) *Attorney, Agent, or Firm* — Li & Cai Intellectual Property (USA) Office

(57) ABSTRACT

A method for detecting azimuthal angle of a heat source includes a preparing step and a detecting step. The preparing step includes: detecting a unit period (Tc) by rotating a target positioning portion through one circle, and aligning the target positioning portion with an aligning member. The detecting step includes: driving the target positioning portion to rotate. The position of the aligning member defines an initial azimuthal position. When an infrared signal emitted from the external heat source is transmitted into an infrared sensor via the target positioning portion, a transmitting time is defined as a time point (Ts) of the heat source, and an angle between the target positioning portion and the initial azimuthal position is defined as an azimuthal angle ($\Theta x$) of the heat source, in which $\Theta x = (Ts/Tc) \times 360°$.

9 Claims, 16 Drawing Sheets

(56) References Cited

U.S. PATENT DOCUMENTS

| | | | |
|---|---|---|---|
| 2004/0129434 A1* | 7/2004 | Tan | A62C 37/40 169/37 |
| 2007/0240765 A1* | 10/2007 | Katzman | E03B 7/077 137/218 |
| 2010/0055312 A1* | 3/2010 | Kato | C23C 16/45502 427/255.26 |

* cited by examiner

APPARATUS AND METHOD FOR DETECTING AZIMUTHAL ANGLE OF HEAT SOURCE

BACKGROUND OF THE INVENTION

1. Field of the Invention

The instant invention relates to an apparatus and a method for detecting an azimuthal angle of a heat source; in particular, to an infrared sensing apparatus and a method for detecting an azimuthal angle of a static heat source or a movable heat source.

2. Description of Related Art

The conventional infrared sensing apparatus equipped with at least one infrared sensor is usually used to detect whether a heat source enters into the scanning area thereof or not. Specifically, the conventional infrared sensing apparatus cannot be used to detect whether the heat source remains in the scanning area or not, and the conventional infrared sensing apparatus cannot be used to detect an azimuthal angle of the heat source. Thus, how to use an infrared sensing apparatus to detect an azimuthal angle of a heat source is one of the objectives in this field.

SUMMARY OF THE INVENTION

The instant disclosure provides an apparatus and a method for detecting an azimuthal angle of a heat source for effectively solving a problem, which is an infrared sensing apparatus equipped with a single infrared sensor cannot be operated to detect an azimuthal angle of a heat source.

The instant disclosure provides an apparatus for detecting an azimuthal angle of a heat source, comprising: a controlling device, comprising: a circuit board; a micro-controller electrically connected to the circuit board; and a driving module electrically connected to the circuit board, wherein the driving module is electrically connected to the micro-controller via the circuit board; and a detecting device, comprising: a turntable connected to the driving module; a reference member disposed on the turntable; a positioning member installed on the turntable and having a target positioning portion, wherein the driving module is configured to drive the positioning member to rotate along an axis; an infrared sensor electrically connected to the circuit board for receiving an infrared signal transmitted into the detecting device through the positioning member, wherein a signal strength defined by an infrared signal transmitted into the infrared sensor through the target positioning portion of the positioning member is different from a signal strength defined by an infrared signal transmitted into the infrared sensor through the other portion of the positioning member; and an aligning member electrically connected to the controlling device, wherein the aligning member and the reference member co-define a starting time reference when the target positioning portion starts to rotate.

The instant disclosure also provides a method for detecting an azimuthal angle of a heat source, comprising: providing an infrared sensing apparatus, wherein the infrared sensing apparatus comprises a controlling device and a detecting device electrically connected to the controlling device, the detecting device comprises: a target positioning portion which is rotatable along an axis; an infrared sensor; and an aligning member electrically connected to the controlling device, wherein the aligning member defines a starting time reference when the target positioning portion starts to rotate; implementing a plurality of detecting steps by using the infrared sensing apparatus, wherein the detecting steps comprises: (a) operating the controlling device to detect a unit period (Tc) by using the aligning member, and then operating the controlling device to order the target positioning portion to stop and to align with the aligning member, wherein the unit period is defined by rotating the target positioning portion through one circle; (b) operating the infrared sensing apparatus to scan a scanning area; (c) when an external heat source entering into the scanning area is detected by the infrared sensing apparatus, operating the controlling device to drive the target positioning portion to rotate, and a judgment of the infrared sensing apparatus corresponding to the position of the external heat source comprising: defining a plane perpendicular to the axis as an azimuthal plane, wherein the axis is a central axis of the azimuthal plane, wherein at the azimuthal plane, the aligning member is orthogonally projected onto the azimuthal plane to define an initial azimuthal position, the axis and the initial azimuthal position co-define a first line connected therebetween, and the first line is defined as 0° of the azimuthal plane; defining a time point (Ts) of the external heat source by mapping a particular time to the unit period, wherein an infrared signal emitted from the external heat source is transmitted into the infrared sensor through the target positioning portion at the particular time; defining a heat source position by orthogonally projecting the target positioning portion onto the azimuthal plane at the time point, wherein in the azimuthal plane, the axis and the heat source position co-define a second line connected there-between; and defining an angle between the first line and the second line as an azimuthal angle ($\Theta$x) of the external heat source, wherein the azimuthal angle is obtained by using the controlling device to calculate an equation: $\Theta x=(Ts/Tc)\times 360°$; and (d) when the external heat source leaving out the scanning area is detected by the infrared sensing apparatus, operating the controlling device to selectively order the target positioning portion to stop, and operating the controlling device to order the target positioning portion to align with the aligning member.

In summary, the infrared sensing apparatus and the method of the instant disclosure are provided to rapidly obtain the azimuthal angle of the external heat source at the time point by using the infrared sensor to receive the infrared signals, which are emitted from the external heat source with two kinds of signal strengths, and by using the cooperation of the aligning member and the target positioning portion.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

[First Embodiment]

Figure 1A:
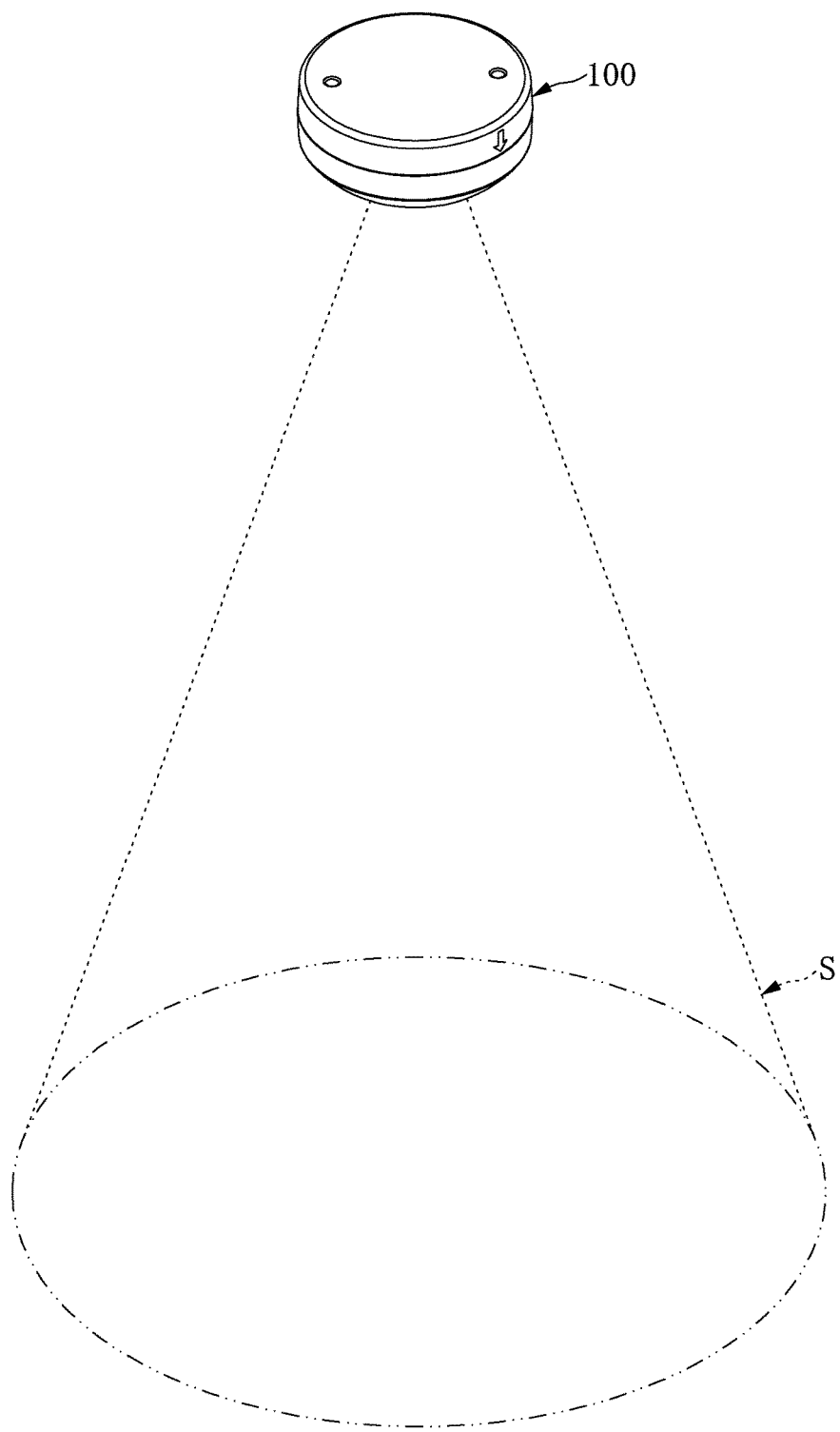
FIG. 1A is a perspective view showing an infrared sensing apparatus, which is applied to a method for detecting an azimuthal angle of a heat source, according to a first embodiment of the instant disclosure.

Please refer to FIGS. 1 through 9, which show a first embodiment of the instant disclosure. References are hereunder made to the detailed descriptions and appended drawings in connection with the instant invention. However, the appended drawings are merely shown for exemplary purposes, rather than being used to restrict the scope of the instant invention.

The instant embodiment provides an apparatus 100 (i.e., an infrared sensing apparatus 100) and a method for detecting an azimuthal angle of a heat source, and the method in the instant embodiment is implemented by using the infrared sensing apparatus 100. The infrared sensing apparatus 100 includes a case 3, a controlling device 1 arranged in the case 3, and a detecting device 2 arranged in the case 3 and electrically connected to the controlling device 1. The following description discloses each component of the infrared sensing apparatus 100, and then discloses the method.

Figure 2:
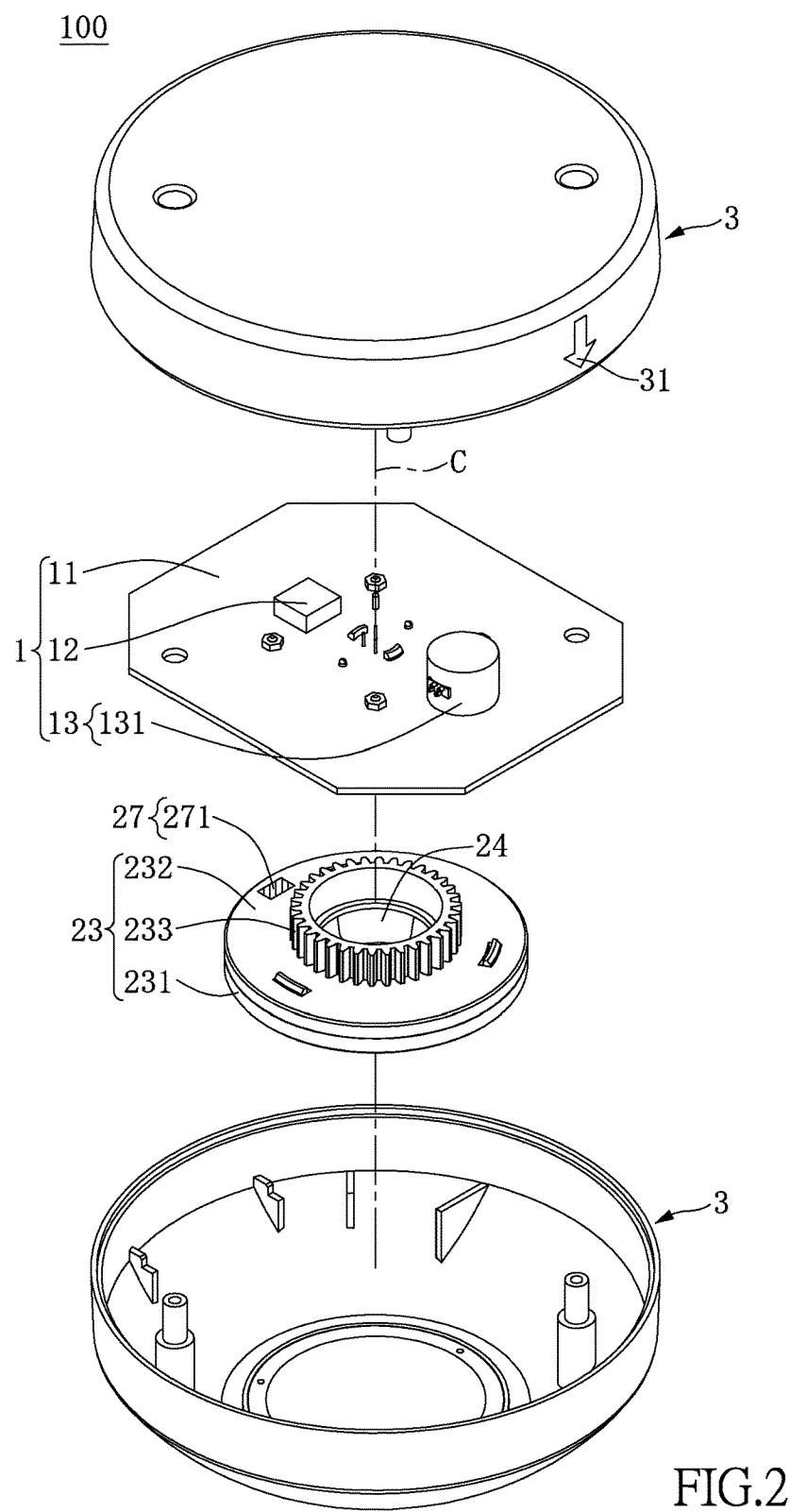
FIG. 2 is an exploded view of the infrared sensing apparatus shown in FIG. 1A.
Figure 3:
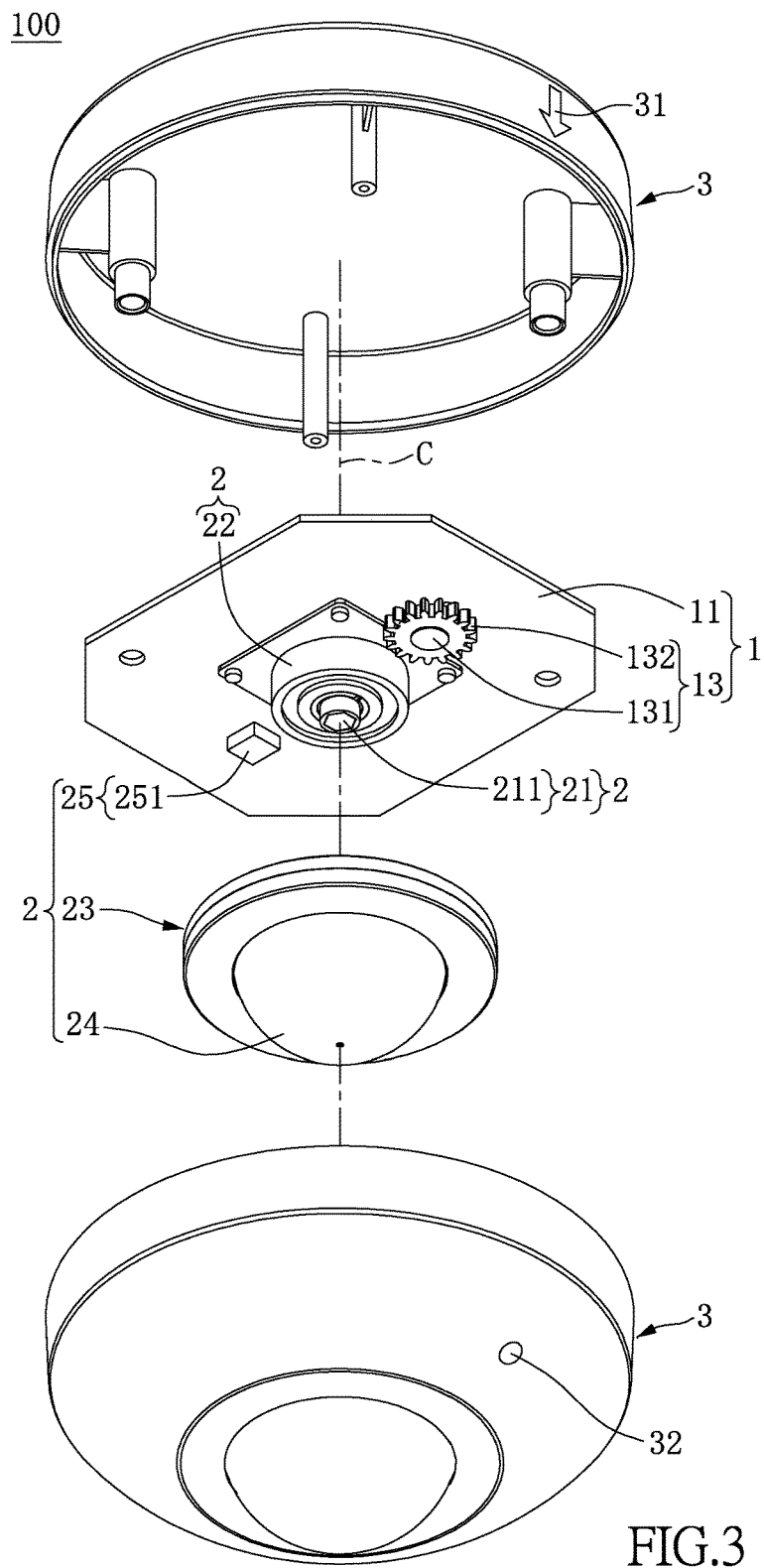
FIG. 3 is an exploded view of the infrared sensing apparatus shown in FIG. 1A from another perspective
Figure 6:
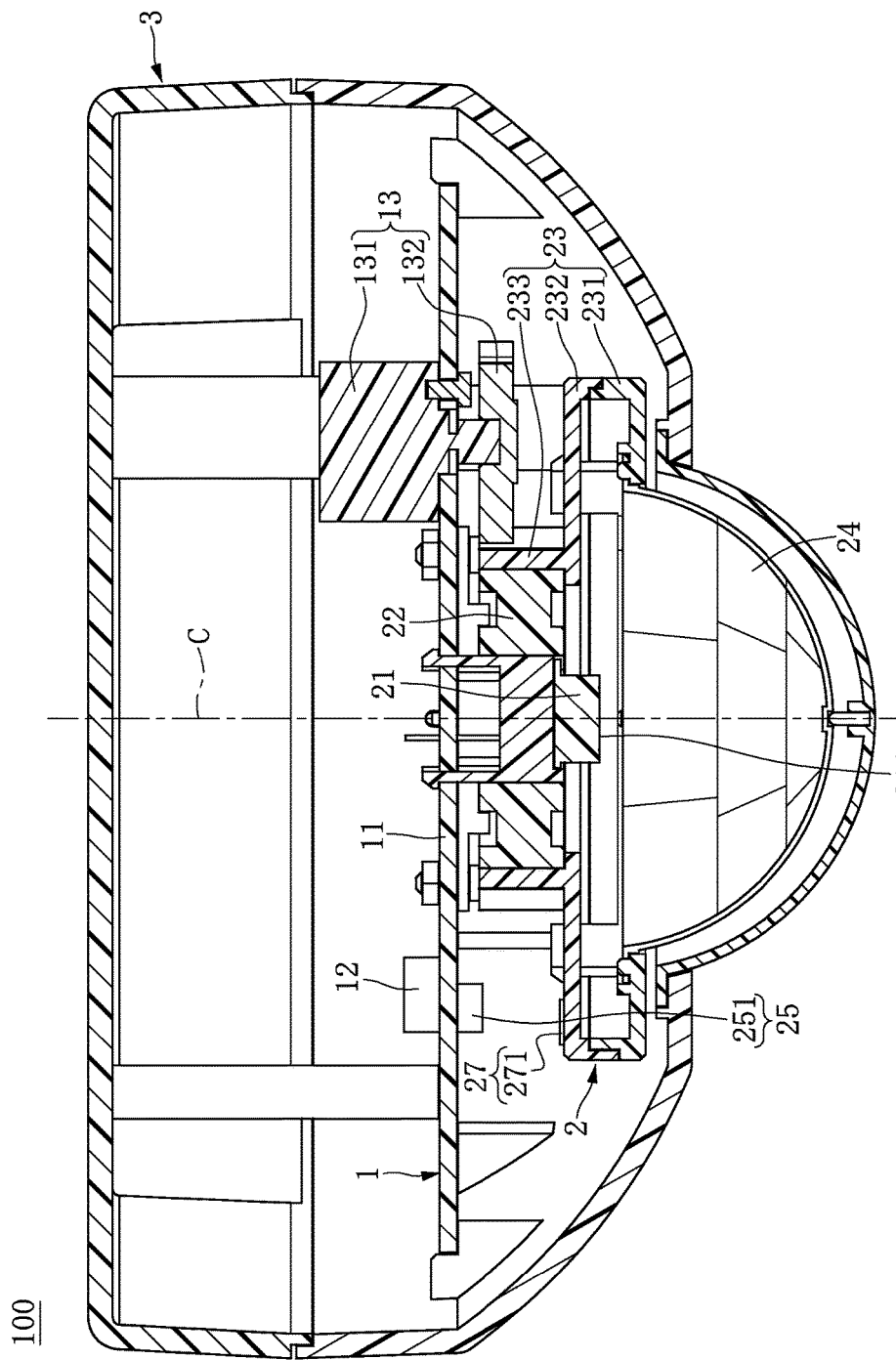
FIG. 6 is a cross-sectional view of the infrared sensing apparatus shown in FIG. 1A.

Please refer to FIGS. 2 and 3, and with reference occasionally made to FIG. 6. The controlling device 1 includes a circuit board 11, a micro-controller 12 installed on the circuit board 11, and a driving module 13 installed on the circuit board 11 and electrically connected to the micro-controller 12. The micro-controller 12 is provided for controlling the operation of each component of the infrared sensing apparatus 100. The driving module 13 in the instant embodiment includes a driving motor 131 and a driving gear 132 connected to the driving motor 131.

The detecting device 2 includes an infrared sensor 21 fixed on the circuit board 11, a bearing 22 sleeved at the infrared sensor 21, a turntable 23 installed on the bearing 22, a positioning member 24 disposed on the turntable 23, and an aligning member 25 electrically connected to the controlling device 1.

The infrared sensor 21 has a detecting surface 211 arranged away from the circuit board 11, and the infrared sensor 21 is electrically connected to the micro-controller 12 of the controlling device 1. Thus, a signal received by the detecting surface 211 of the infrared sensor 21 can be transmitted to the micro-controller 12 by the infrared sensor 21, such that the micro-controller 12 can emit an order according to the signal. Moreover, a central line of the infrared sensor 21 in the instant embodiment is defined as an axis C, and the number of the infrared sensor 21 of the infrared sensing apparatus 100 in the instant embodiment is only one. That is to say, the infrared sensing apparatus having at least two infrared sensors is not the preferred embodiment of the instant disclosure. In addition, the infrared sensor 21 can be a pyroelectric infrared sensor or a thermal imaging sensor, and the accuracy of the infrared sensor 21 can be chosen according to the designer's demand.

The turntable 23 includes a first ring portion 231, a second ring portion 232 connected to the first ring portion 231, and a transmission gear 233 connected to the second ring portion 232. The maximum diameter of the first ring portion 231 is approximately identical to the maximum diameter of the second ring portion 232, and the maximum diameter of the transmission gear 233 is smaller than the maximum diameter of the second ring portion 232. The bearing 22 is inserted into the transmission gear 233, and the centers of the transmission gear 233 and the second ring portion 232 are located at the axis C. Moreover, the transmission gear 233 is engaged with the driving gear 132 of the driving module 13, so the driving module 13 can be operated to drive the turntable 23 to rotate along the axis C.

Figure 4:
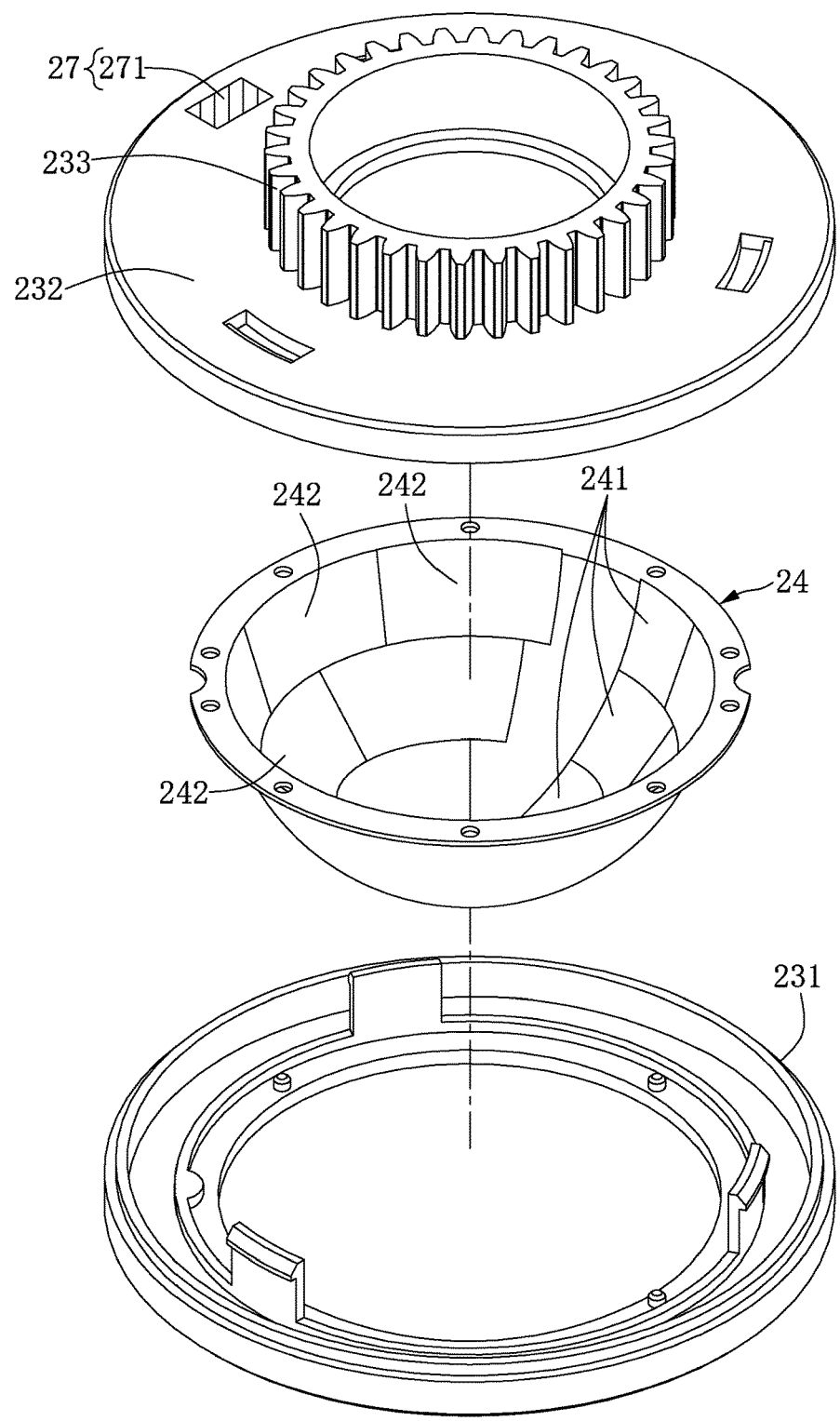
FIG. 4 is an exploded view of a turntable and a positioning member, both shown in FIG. 2.
Figure 5:
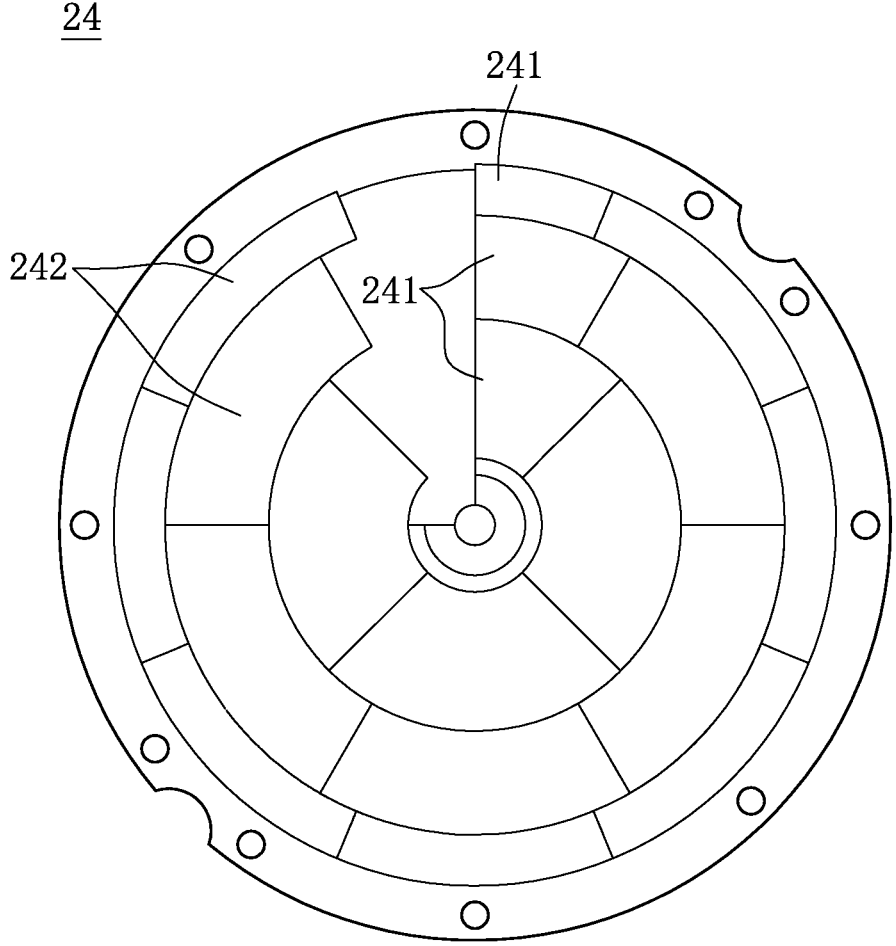
FIG. 5 is a top view of the positioning member shown in FIG. 4.

As shown in FIGS. 4 and 5, the positioning member 24 has a hemispherical shell and a flange extended from an edge of the shell, the flange of the positioning member 24 is installed between the first ring portion 231 and the second ring portion 232 (i.e., the edge of the positioning member 24 is fixed on the first ring portion 231), and the shell of the positioning member 24 is arranged to protrude from the turntable 23. Thus, when the driving module 13 is operated to drive the turntable 23 to rotate, the turntable 23 brings the positioning member 24 to rotate along the axis C. Specifically, an outer surface of the positioning member 24 is a smooth surface, and an inner side of the positioning member 24 has a target positioning portion 241 and a plurality of condensing portions 242. The construction of the target positioning portion 241 is different from the construction of each one of the condensing portions 242. Each one of the condensing portions 242 is semi-transparent or non-transparent, and each one of the condensing portions 242 in the instant embodiment is a single convex lens. The target positioning portion 241 in the instant embodiment consists of a plurality of semi-convex lenses and a light-shielding construction connected to the semi-convex lenses. The hemispherical shell of the positioning member 24 is provided in order to detect at least half of an accommodating space. In other words, when the infrared sensing apparatus 100 is disposed on a wall in a cubic space, the infrared sensing apparatus 100 can be used to detect all of the cubic space.

Moreover, the condensing portions 242 and the target positioning portion 241 are provided with a focal point, and the focal point is located at the axis C and is located at the detecting surface 211 of the infrared sensor 21. Thus, because the construction of the target positioning portion 241 is different from the construction of each one of the condensing portions 242, a first signal strength defined by an infrared signal transmitted into the detecting surface 211 of the infrared sensor 21 through the target positioning portion 241 will be smaller than a second signal strength defined by an infrared signal transmitted into the detecting surface 211 of the infrared sensor 21 through any one of the condensing portions 242. In other words, an infrared signal transmitted into the detecting surface 211 of the infrared sensor 21 has two kinds of signal strengths by respectively passing through the target positioning portion 241 and any one of the condensing portions 242.

Specifically, because each condensing portion 242 in the instant embodiment is a single convex lens, and the target positioning portion 241 in the instant embodiment consists of the semi-convex lenses and the light-shielding construction, an infrared signal will be shielded by the light-shielding construction when the infrared signal passes through the target positioning portion 241, such that the first signal strength is approximately half of the second signal strength.

In summary, the positioning member 24 is provided with the hemispherical shell in order to arrange the detecting surface 211 of the infrared sensor 21 at the focal point of the positioning member 24, such that an external infrared signal existing outside of the infrared sensing apparatus 100 can focus on the detecting surface 211 of the infrared sensor 21 by passing through the hemispherical positioning member 24, thereby increasing a signal receiving area of the positioning member 24. That is to say, if any external infrared signal passes through the positioning member 24, the positioning member 24 will guide the external infrared signal to focus on the detecting surface 211 of the infrared sensor 21. Thus, the infrared sensor 21 can be provided with a broader receiving area by cooperating with the hemispherical positioning member 24.

In addition, the positioning member 24 in the instant embodiment is provided to guide the external infrared signal to focus on the detecting surface 211 of the infrared sensor 21 by forming convex lenses and semi-convex lenses, but the construction of the positioning member 24 is not limited thereto. For example, the positioning member 24 can be provided with a reflecting lens (not shown) or a Fresnel's lens (not shown) to guide the external infrared signal to focus on the detecting surface 211 of the infrared sensor 21.

As shown in FIG. 6, the aligning member 25 is configured to calculate a unit period (Tc), and the unit period is defined by rotating the target positioning portion 241 of the positioning member 24 through one circle. In other words, the aligning member 25 is used to define a starting time reference when the positioning member 24 starts to rotate. The aligning member 25 in the instant embodiment includes an optical receiver 251 installed on the circuit board 11 and electrically connected to the micro-controller 12. A reference member 27 is disposed on the second ring portion 232 of the turntable 23, and the position of the reference member 27 corresponds to the position of the target positioning portion 241. The reference member 27 in the instant embodiment is a reflecting sheet 271, and the optical receiver 251 can be operated to receive an optical signal reflected from the reflecting sheet 271 when the reflecting sheet 271 is facing to the optical receiver 251. Thus, after the reflecting sheet 271 (or the target positioning portion 241) is aligned with the optical receiver 251, when the turntable 23 is rotated through one circle to cause the optical receiver 251 to get an optical signal reflected from the reflecting sheet 271, the micro-controller 12 can obtain the unit period (Tc) by getting a signal transmitted from the optical receiver 251. Moreover, the reflecting sheet 271 is configured to be a reference when the positioning member 24 starts to rotate. In other words, when the positioning member 24 is rotated through one circle, the reflecting sheet 271 presents a position about 0° and a position about 360°, which are overlapped. Thus, the reference member 27 can be further provided with a plurality of reflecting sheets 271 to respectively present a position about 90°, a position about 180°, and a position about 270°, thereby increasing the accuracy of the infrared sensing apparatus 100.

In addition, in the instant embodiment, the reference member 27 is the reflecting sheet 271 for example, and the optical receiver 251 of the aligning member 25 is cooperated with the reflecting sheet 271 to provide a starting time reference when the positioning member 24 starts to rotate, but the aligning member 25 is not limited to the optical receiver 251. For example, in a non-shown embodiment, the aligning member 25 can be an inching switch to cooperate with a bump, which is disposed on the second ring portion 232 (e.g., the bump is regarded as the reference member 27), thereby providing a starting time reference when the positioning member 24 starts to rotate; or, the aligning member 25 can be an optical isolator to cooperate with a shielding structure, which is disposed on the second ring portion 232 (e.g., the shielding structure is regarded as the reference member 27), thereby providing a starting time reference when the positioning member 24 starts to rotate.

The infrared sensing apparatus 100 has been disclosed in the above description, and the following description discloses the method of the instant disclosure for detecting an azimuthal angle of a heat source (as shown in FIG. 1C and FIGS. 7 through 9).

The infrared sensing apparatus 100 is provided for the method, and the construction of the infrared sensing apparatus 100 is not disclosed again. When any component of the infrared sensing apparatus 100 is disclosed in the following description, please refer to the above description and the corresponding figures.

Step (a): the micro-controller 12 of the controlling device 1 is operated to order the driving module 13 to rotate the turntable 23 and the positioning member 24 (e.g., the target positioning portion 241) disposed on the turntable 23, and the controlling device 1 is operated to detect a unit period (Tc), which is defined by rotating the target positioning portion 241 through one circle, by using the aligning member 25, and the controlling device 1 is operated to record a situation about a transient heat source in a scanning area S of the infrared sensing apparatus 100. The controlling device 1 is operated to compare the situation and an ambient temperature defined by a predetermined parameter, if no external heat source 200 exists in the scanning area S, the infrared sensing apparatus 100 is operated to update the situation, which will be a reference for comparing with a next situation, and then the infrared sensing apparatus 100 is in a standby state; or if at least one external heat source 200 exists in the scanning area S, the step (c) is implemented. Specifically, when the infrared sensing apparatus 100 is in the standby state, the controlling device 1 is operated to order the turntable 23 and the positioning member 24 (e.g., the target positioning portion 241) disposed on the turntable 23 to stop and to align with the aligning member 25.

Figure 1B:
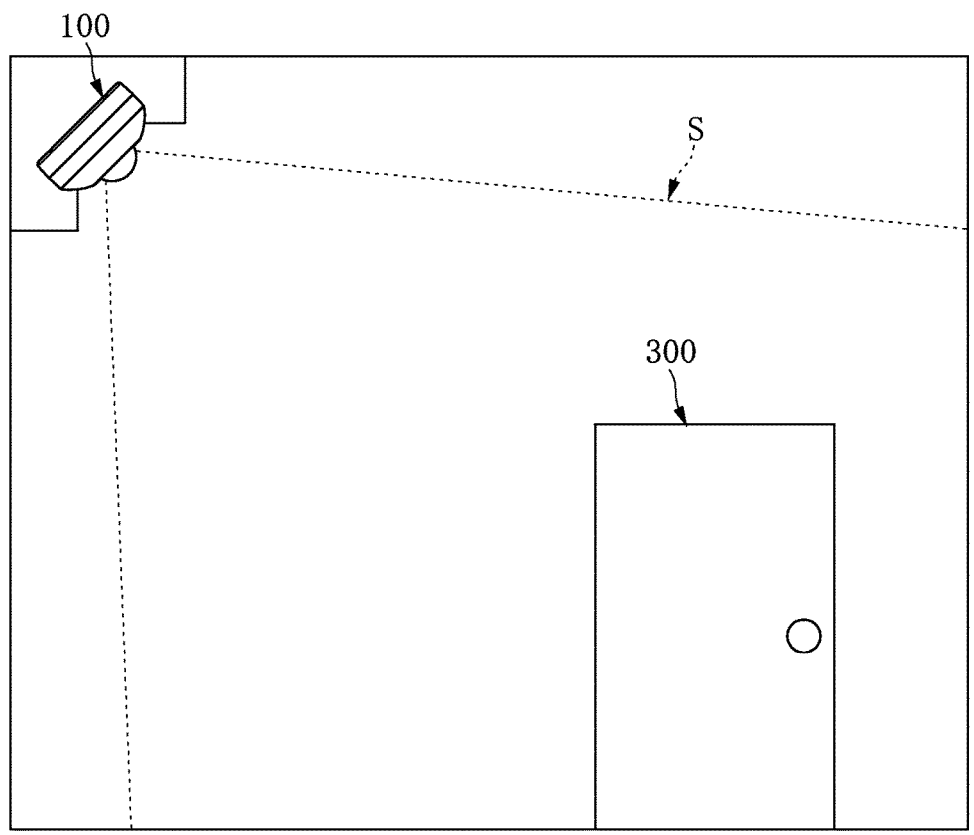
FIG. 1B is a perspective view showing an installation mode of the infrared sensing apparatus shown in FIG. 1A.
Figure 1C:
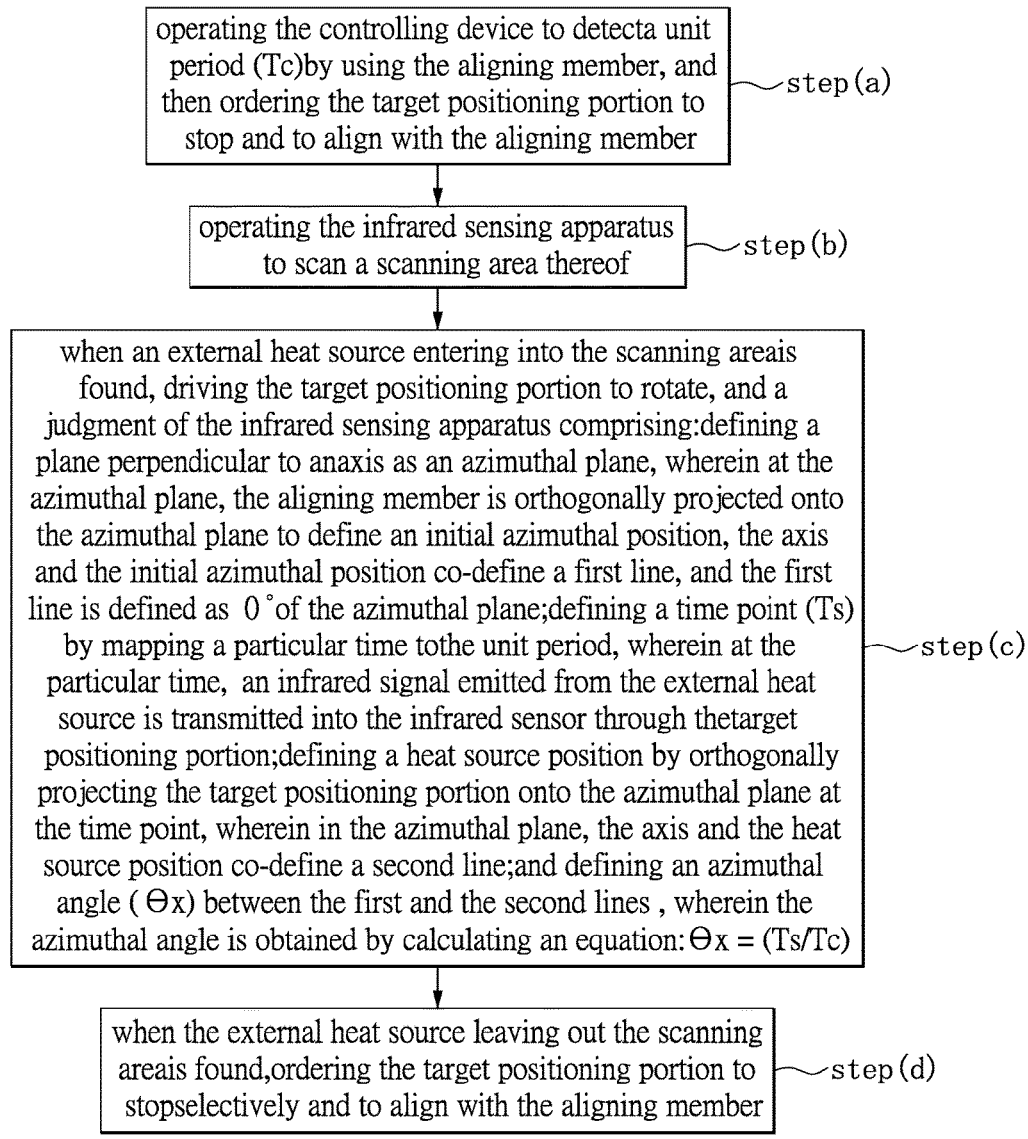
FIG. 1C is a flow chart showing the method of the instant disclosure.

Moreover, when the infrared sensing apparatus 100 is arranged in an environment with at least one gateway 300 (as shown in FIG. 1B), the gateway 300 is regarded as a generating area of an external heat source 200. Accordingly, when the infrared sensing apparatus 100 is in the standby state, the scanning area S of the infrared sensing apparatus 100 preferably covers the gateway 300, and the light-shielding construction of the target positioning portion 241 does not face toward the gateway 300, thereby avoiding the light-shielding construction from shielding an infrared signal, which is emitted from an external heat source that appears at the gateway 300. Thus, the above arrangement of the infrared sensing apparatus 100 can increase a reaction rate of detection of an external heat source 200.

A direction label 31 can be disposed on a portion of the case 3, and the position of the direction label 31 corresponds to the position of the light-shielding construction of the target positioning portion 241. Thus, if the infrared sensing apparatus 100 is used, a user can easily arrange the infrared sensing apparatus 100 at a suitable position for detection, that is to say, a desired scanning area of the user can easily match the scanning area S of the infrared sensing apparatus 100. Moreover, the arrangement, where the light-shielding construction of the target positioning portion 241 does not face toward the gateway 300, can be achieved by using the direction label 31.

Step (b): the infrared sensing apparatus 100 being in the standby state is uninterruptably operated to detect an external heat source, and the positioning member 24 does not rotate. It should be noted that the scanning area S of the infrared sensing apparatus 100 as shown in the figures is one example, but the scanning area S of the infrared sensing apparatus 100 in the instant disclosure is not limited thereto.

Figure 7:
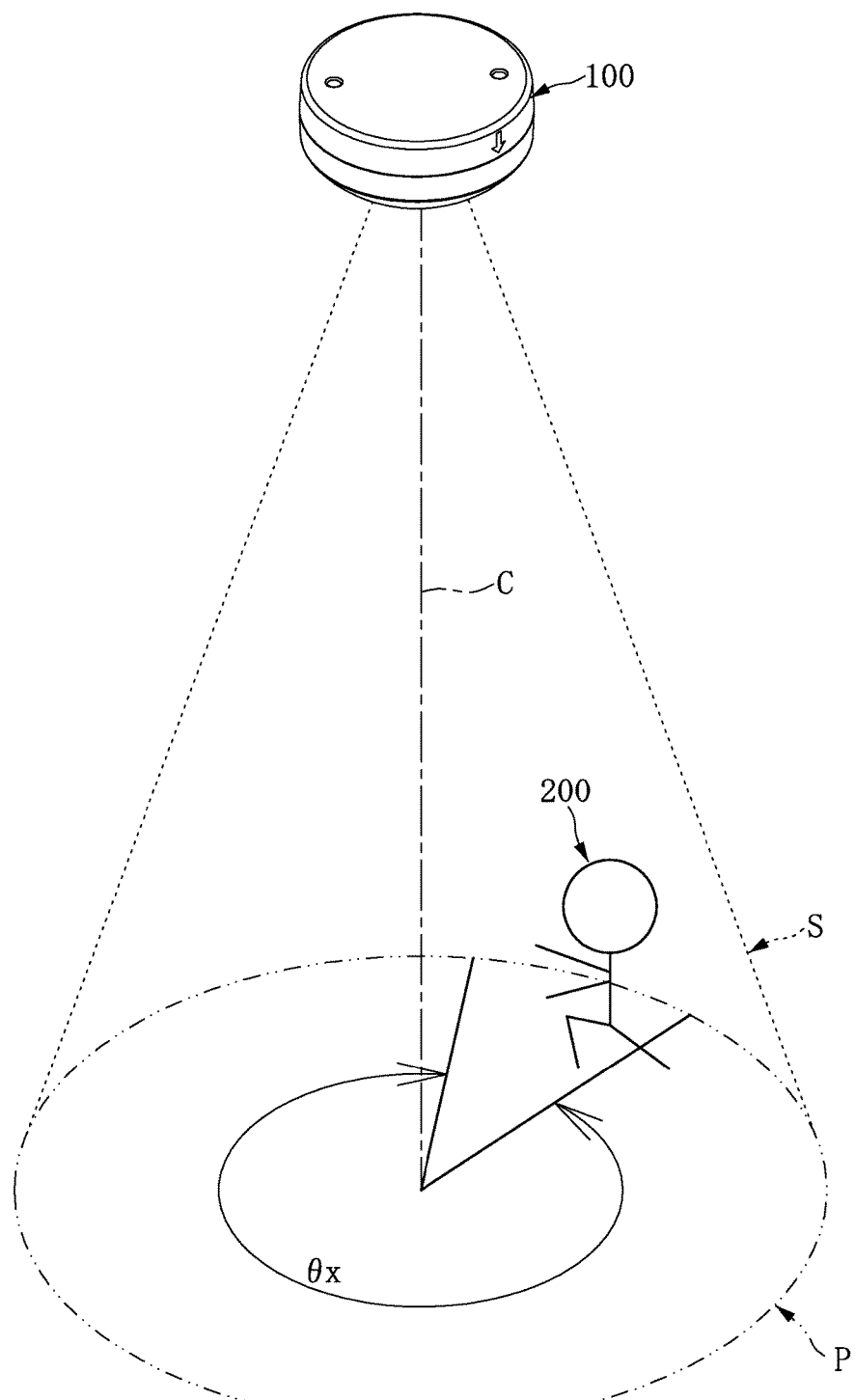
FIG. 7 is a perspective view showing a step (c) of the method according to the first embodiment.

Step (c): when an external heat source 200 (i.e., a person) entering into the scanning area S (as shown in FIG. 7) is detected by the infrared sensing apparatus 100, the infrared sensing apparatus 100 is operated to judge a position of the external heat source 200, and the controlling device 1 is operated to selectively emit an electrical signal to control an external device (e.g., an alarm device or a heat dissipating device). In practical use, when an external heat source 200 (i.e., a person) entering into the scanning area S is detected by the infrared sensing apparatus 100, the infrared sensing apparatus 100 is operated to detect a temperature of the surrounding environment, and the infrared sensing apparatus 100 is operated to order the heat dissipating device (not shown) to be in a standby state if the temperature of the surrounding environment is higher than 30° C.

In the instant embodiment, an external heat source 200 entering into the scanning area S is judged according to a signal strength received by the infrared sensor 21. Specifically, if a distribution of the signal strength received by the infrared sensor 21 is different from the updated situation disclosed in the step (a), the micro-controller 12 judges that an external heat source 200 has entered into the scanning area S of the infrared sensing apparatus 100.

Figure 8:
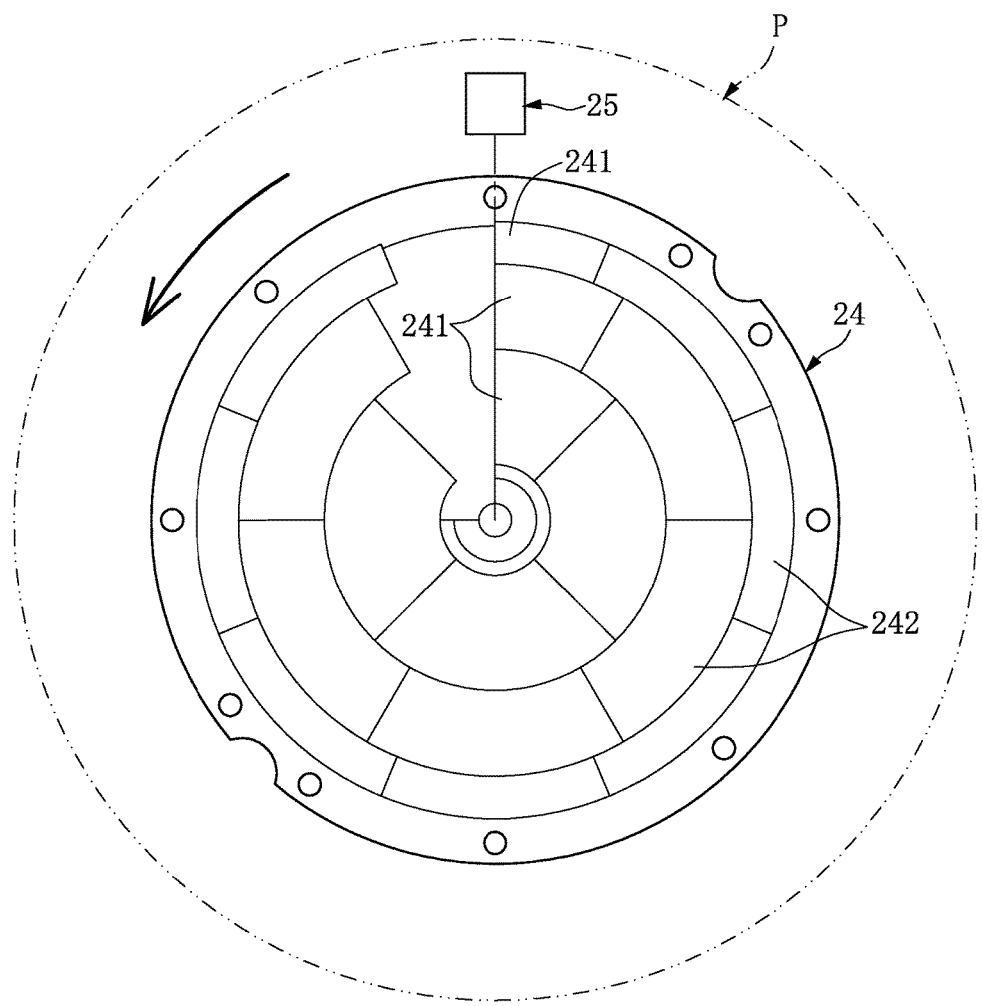
FIG. 8 is a first perspective view showing the operation of the infrared sensing apparatus in the step (c)
Figure 9:
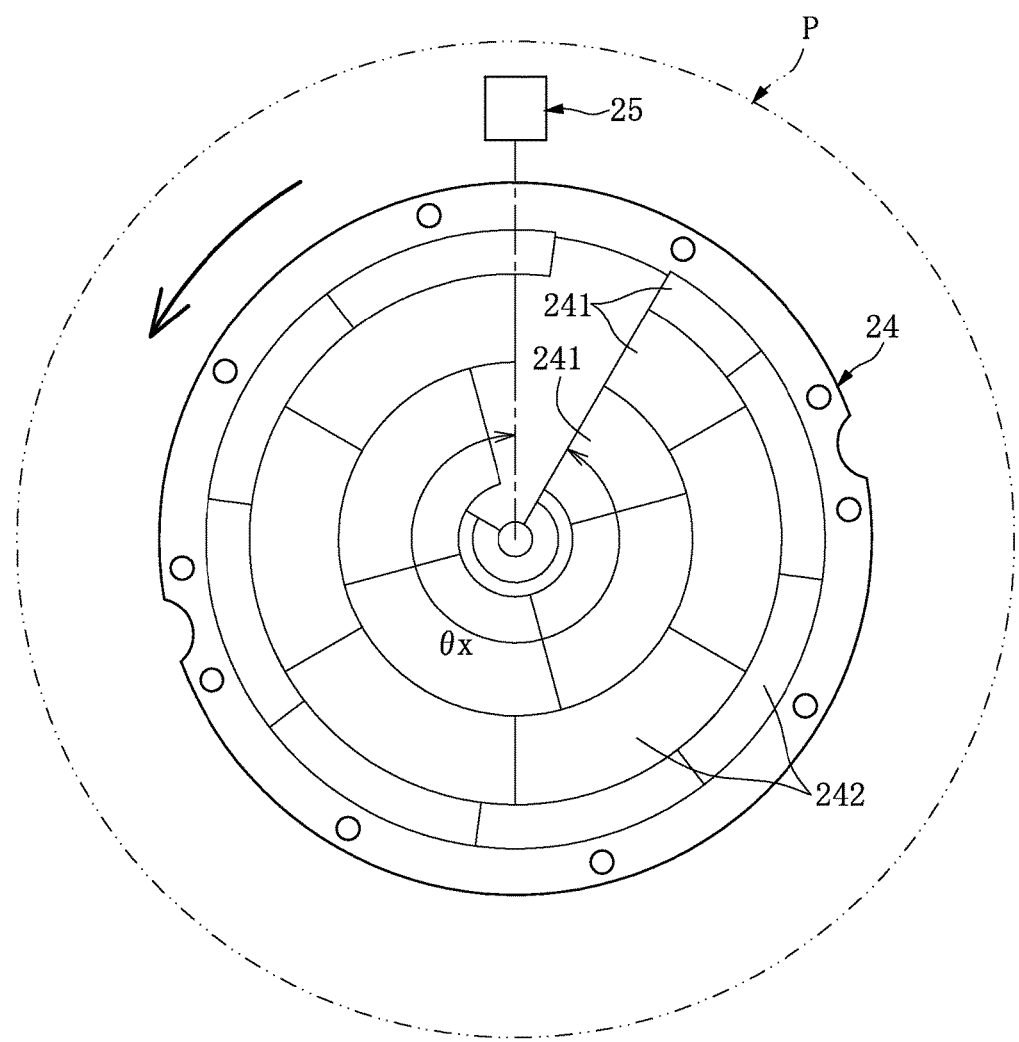
FIG. 9 is a second perspective view showing the operation of the infrared sensing apparatus in the step (c)

Moreover, the judgment of the infrared sensing apparatus 100 corresponding to the position of the external heat source 200 comprises: the micro-controller 12 of the controlling device 1 is operated to order the driving module 13 to rotate the turntable 23 and the positioning member 24 (e.g., the target positioning portion 241) disposed on the turntable 23 (as shown in FIGS. 8 and 9). During the rotation of the target positioning portion 241, the rotating rate of the target positioning portion 241 is controlled to be smaller than a signal receiving frequency of the infrared sensor 21, thereby avoiding a position offset problem or a signal weak problem occurring to the infrared sensor 21. In the instant embodiment, the controlling device 1 is operated to control the target positioning portion 241 to rotate through one circle in twenty seconds, but it is not limited thereto. In addition, when the controlling device 1 is operated to drive the positioning member 24 to rotate, the infrared sensor 21 receives a plurality of infrared signals emitted from the external heat source 200 with two kinds of signal strengths. Specifically, one of the signal strengths defined by an infrared signal transmitted onto the detecting surface 211 of the infrared sensor 21 through the target positioning portion 241 is smaller than the other signal strength defined by an infrared signal transmitted onto the detecting surface 211 of the infrared sensor 21 through any one of the condensing portions 242.

The judgment of the infrared sensing apparatus 100 corresponding to the position of the external heat source 200 is further disclosed as follows. A plane (e.g., ground) perpendicular to the axis C is defined as an azimuthal plane P, and the axis C is a central axis of the azimuthal plane P. At the azimuthal plane P, the aligning member 25 is orthogonally projected onto the azimuthal plane P to define an initial azimuthal position, and the axis C and the initial azimuthal position co-define a first line connected there-between. The first line is defined as 0° of the azimuthal plane P.

An infrared signal emitted from the external heat source 200 is transmitted onto the detecting surface 211 of the infrared sensor 21 through the target positioning portion 241 at a particular time, the particular time maps to the unit period (Tc) to define a time point (Ts) of the external heat source 200. That is to say, before the time point (Ts), any infrared signal, which is emitted from the external heat source 200, transmitted onto the detecting surface 211 of the infrared sensor 21 does not pass through the target positioning portion 241.

The target positioning portion 241 is orthogonally projected onto the azimuthal plane P at the time point to define a heat source position. At the azimuthal plane P, the axis C and the heat source position co-define a second line connected there-between, and an angle between the first line and the second line is defined as an azimuthal angle ($\ominus$x) of the external heat source 200. The azimuthal angle is obtained by using the micro-controller 12 of the controlling device 1 to calculate an equation: $\ominus x = (Ts/Tc) \times 360°$. Moreover, when the azimuthal angle is obtained, the controlling device 1 is operated to selectively emit an electrical signal to control an external device. In practical use, if the external heat source 200 (i.e., person) is located at a position for more than a predetermined time, the infrared sensing apparatus 100 is operated to start a heat dissipating device corresponding to the position of the external heat source 200.

Step (d): when the fact that the external heat source 200 has left out of the scanning area S is detected by the infrared sensing apparatus 100, the infrared sensing apparatus 100 is operated to update the situation about the transient heat source, and then the infrared sensing apparatus 100 is in the standby state. Specifically, when the infrared sensing apparatus 100 is in the standby state, the controlling device 1 is operated to order the turntable 23 and the positioning member 24 (e.g., the target positioning portion 241) disposed on the turntable 23 to stop and to align with the aligning member 25. Moreover, when the fact that the external heat source 200 has left out of the scanning area S is detected by the infrared sensing apparatus 100, the controlling device 1 is operated to selectively emit an electrical signal to control an external device. In practical use, if the external heat source 200 (e.g., person) leaves the scanning area S of the infrared sensing apparatus 100, the infrared sensing apparatus 100 is operated to stop a heat dissipating device arranged in the scanning area S.

In the instant embodiment, an external heat source 200 leaving the scanning area S is judged according to a signal strength received by the infrared sensor 21. Specifically, if a distribution of the signal strength received by the infrared sensor 21 is identical to the updated situation disclosed in the step (a), the micro-controller 12 judges that an external heat source 200 has left the scanning area S of the infrared sensing apparatus 100.

In summary, the infrared sensing apparatus 100 and the method the instant embodiment are provided to rapidly obtain the azimuthal angle of the external heat source 200 at a time point by using the infrared sensor 21 to receive the infrared signals, which are emitted from the external heat source 200 with two kinds of signal strengths, and using the cooperation of the aligning member 25 and the target positioning portion 241.

Moreover, the updated situation disclosed in the step (a), which is obtained by using the single infrared sensor 21, is provided to be a reference for judging that an external heat source 200 enters into or leaves out of the scanning area S of the infrared sensing apparatus 100, so if an external heat source 200 exists in the scanning area S, the infrared sensing apparatus 100 can rapidly know. Accordingly, the infrared sensing apparatus 100 and the method of the instant embodiment can be used to detect an azimuthal angle of a static heat source or a movable heat source.

In the detecting steps (a)~(d), the target positioning portion 241 remains to rotate after being driven until the infrared sensing apparatus 100 is closed. That is to say, when the infrared sensing apparatus 100 is in the standby state, the controlling device 1 is operated to still order the turntable 23 and the positioning member 24 (e.g., the target positioning portion 241) disposed on the turntable 23 to rotate, thereby increasing the reaction rate of detection of an external heat source 200 and updating the situation about transient heat source as soon as possible.

It should be noted that each step in the instant embodiment does not define a specific unit of the unit period (Tc), that is to say, the unit of the unit period (Tc) can be adjusted according to the designer's demand. The following description discloses two examples. First example: in the step (a), the target positioning portion 241 needs M seconds to rotate through one circle, and M seconds is defined as the unit period (Tc); in the step (c), the time point of the external heat source is an Nth seconds of the M seconds, and the equation becomes: $\ominus x=(N/M)\times 360°$. Second example: in the detecting step (a), the infrared sensor 21 is operated to receive a plurality of clocks when the target positioning portion 241 is rotated through one circle, each clock is defined by an external signal being transmitted into the infrared sensor 21 through the target positioning portion 241, and the number of the clocks is R and is defined as the unit period (Tc); in the step (c), the time point of the external heat source is a $Q^{th}$ clock of the clocks, and the equation becomes: $\ominus x=(Q/R)\times 360°$.

In addition, the construction of the infrared sensing apparatus 100 is disclosed for clearly understanding the method of the instant embodiment, but the method of the instant embodiment is not limited to the construction of the infrared sensing apparatus 100.

[Second Embodiment]

Figure 10:
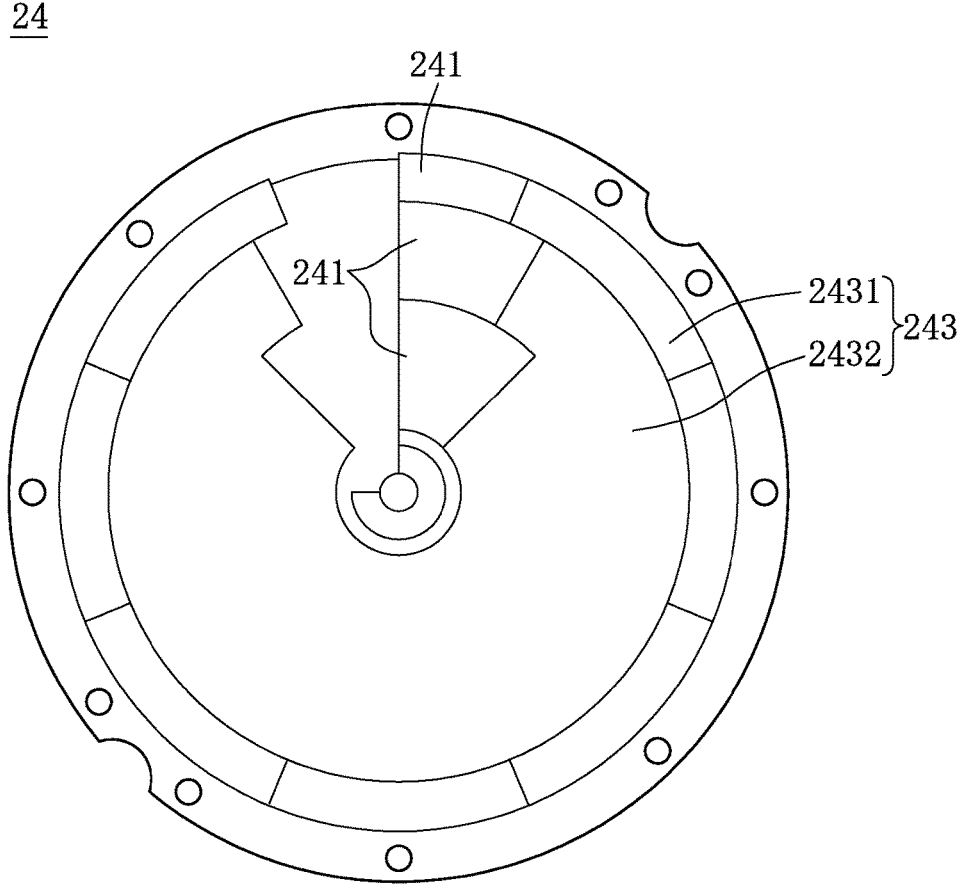
FIG. 10 is a perspective view showing a positioning member of the infrared sensing apparatus according to a second embodiment of the instant disclosure.

Please refer to the FIG. 10, which shows a second embodiment of the instant disclosure. The second embodiment is similar to the first embodiment, so the same features are not disclosed again. The main different features of the two embodiments is disclosed as follows.

The inner side of the positioning member 24 has a target positioning portion 241 and a surrounding portion 243 arranged around the target positioning portion 241. The construction of the target positioning portion 241 is different from the construction of the surrounding portion 243 for causing a signal strength defined by an infrared signal transmitted into the infrared sensor 21 through the target positioning portion 241 to be larger than a signal strength defined by an infrared signal transmitted into the infrared sensor 21 through the surrounding portion 243.

Specifically, the target positioning portion 241 can be semi-transparent or non-transparent, and the target positioning portion 241 in the instant embodiment consists of a plurality of semi-convex lenses and a light-shielding construction connected to the semi-convex lenses. The surrounding portion 243 in the instant embodiment consists of a C-shaped condensing segment 2431 arranged on the outermost of the positioning member 24 and a shielding segment 2432 arranged inside the condensing segment 2431. The condensing segment 2431 consists of a plurality of convex lenses arranged in sequence, and two ends of the condensing segment 2431 are connected to an outermost part of the target positioning portion 241, such that the condensing segment 2431 is configured to detect whether an external heat source 200 enters into the scanning area S or not. Moreover, the target positioning portion 241 is provided with a focal point located at the detecting surface 211 of the infrared sensor 21.

In the step (c), when the controlling device 1 is operated to drive the positioning member 24 to rotate, the infrared sensor 21 receives a plurality of infrared signals emitted from the external heat source 200 with at least two kinds of signal strengths. Specifically, one of the signal strengths defined by an infrared signal transmitted into the infrared sensor 21 through the target positioning portion 241 is different from the other signal strength defined by an infrared signal transmitted into the infrared sensor 21 through the surrounding portion 243. Specifically, in the instant embodiment, an infrared signal emitted from an external heat source 200 can be transmitted into the infrared sensor 21 only by passing through the target positioning portion 241 and the condensing segment 2431, that is to say, an infrared signal emitted from an external heat source 200 cannot be transmitted into the infrared sensor 21 by passing through the shielding segment 2432. In practical use, the infrared sensing apparatus 100 in the instant embodiment takes the positioning member 24 to detect an azimuthal of an heat source, and the infrared sensing apparatus 100 is operated to record a complete signal data when the controlling device 1 is operated to drive the positioning member 24 to rotate through one circle, a largest amplitude of the complete signal data in the unit period (Tc) is defined as a time point (Ts) to calculate the azimuthal angle.

[Third Embodiment]

Figure 11:
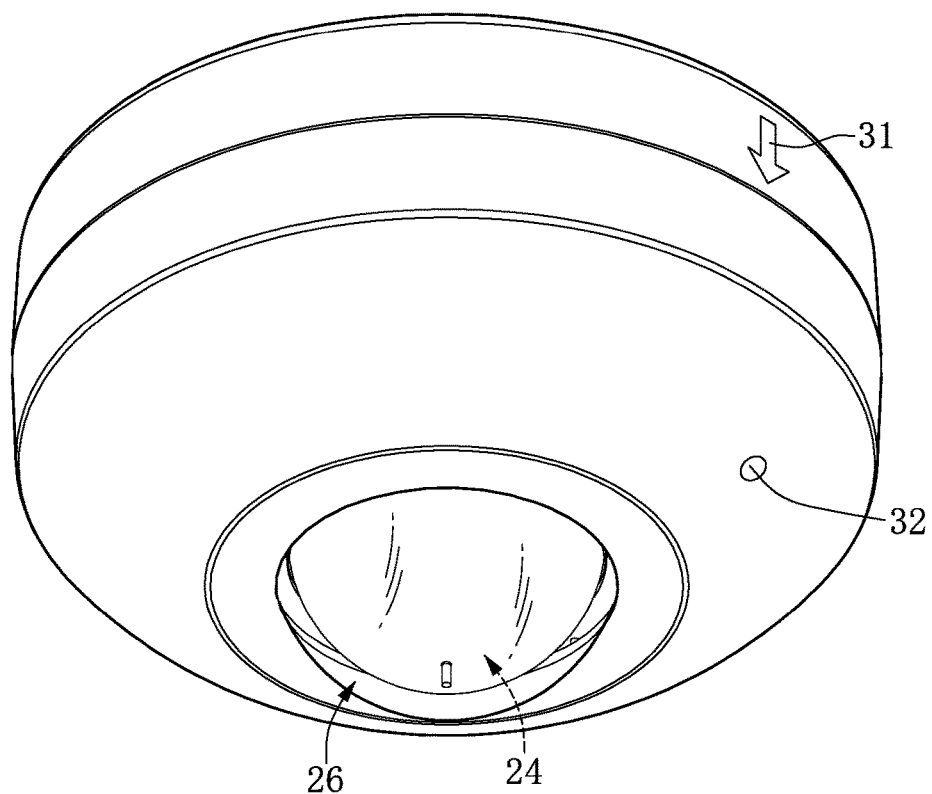
FIG. 11 is a perspective view showing the infrared sensing apparatus according to a third embodiment of the instant disclosure.
Figure 12:
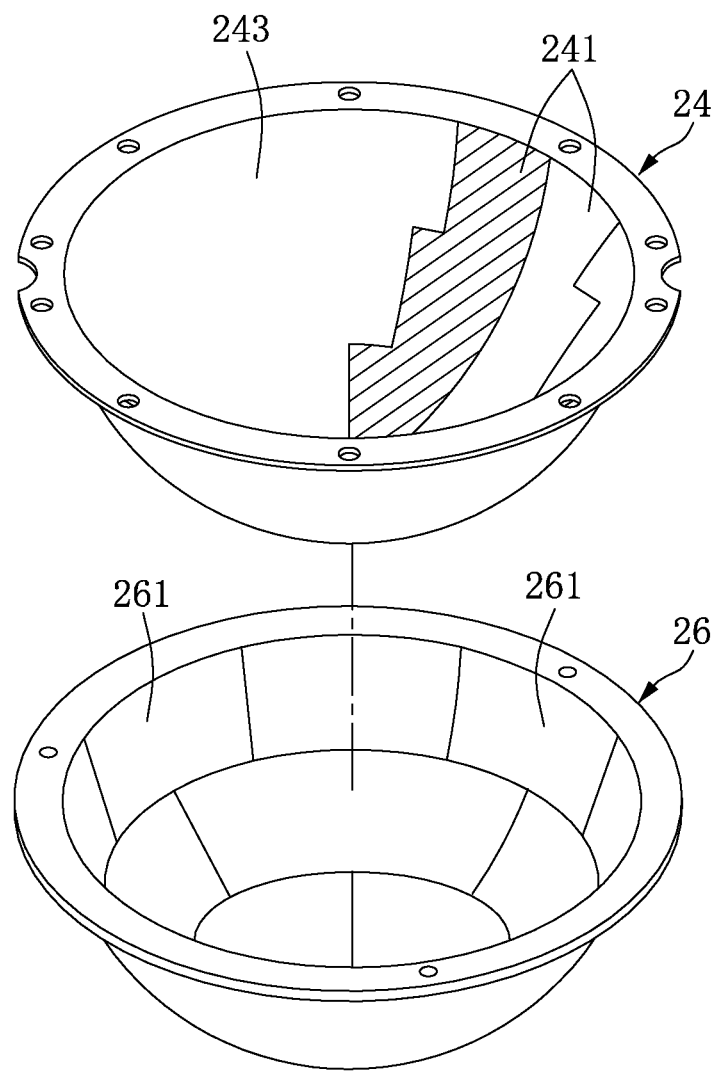
FIG. 12 is a perspective view showing a positioning member and a focusing member of the infrared sensing apparatus shown in FIG. 11.

Please refer to the FIGS. 11 and 12, which show a third embodiment of the instant disclosure. The third embodiment is similar to the second embodiment, so the same features are not disclosed again. The main different feature of the two embodiments is the positioning member 24 of the detecting device 2 and the infrared sensing apparatus 100 of the instant embodiment further includes a focusing member 26 corresponding to the positioning member 24, and the different feature is disclosed as follows.

The focusing member 26 is installed on the case 3 to cover the positioning member 24. The focusing member 26 has a plurality of condensing portions 261, and the positioning member 24 has a target positioning portion 241 and a surrounding portion 243 arranged around the target positioning portion 241. Each one of the condensing portions 261 in the instant embodiment is a single convex lens. The construction of the target positioning portion 241 is different from the construction of the surrounding portion 243 for causing a signal strength defined by an infrared signal transmitted into the infrared sensor 21 through the target positioning portion 241 and one of the condensing portions 261 to be smaller than a signal strength defined by an infrared signal transmitted into the infrared sensor 21 through the surrounding portion 243 and one of the condensing portions 261.

Specifically, the target positioning portion 241 can be semi-transparent or non-transparent, and the target positioning portion 241 in the instant embodiment is a semi-transparent construction (e.g., semi-convex lens) for shielding part of the condensing portion 261. The surrounding portion 243 in the instant embodiment is a transparent construction. Moreover, the condensing portions 261 are provided with a focal point, and the focal point is located at the infrared sensor 21.

In the step (c), when the controlling device 1 is operated to drive the positioning member 24 to rotate, the infrared sensor 21 receives a plurality of infrared signals emitted from the external heat source 200 with two kinds of signal strengths. Specifically, one of the signal strengths defined by an infrared signal transmitted into the infrared sensor 21 through the target positioning portion 241 and one of the condensing portions 261 is smaller than the other signal strength defined by an infrared signal transmitted into the infrared sensor 21 through the surrounding portion 243 and one of the condensing portions 261. Specifically, in the instant embodiment, after an infrared signal emitted from an external heat source 200 passes through one of the condensing portions 261 of the focusing member 26, half of the infrared signal will be shielded by the target positioning portion 241 if the infrared signal is transmitted toward the target positioning portion 241, and the infrared signal will directly pass through the surrounding portion 243 if the infrared signal is transmitted toward the surrounding portion 243, thereby causing two kinds of signal strength.

Accordingly, the advantage of the infrared sensing apparatus 100 of the instant embodiment is that it is provided with the un-rotated focusing member 26, so that the infrared sensor 21 can be operated to receive an infrared signal in a more stable condition.

[Fourth Embodiment]

Figure 13:
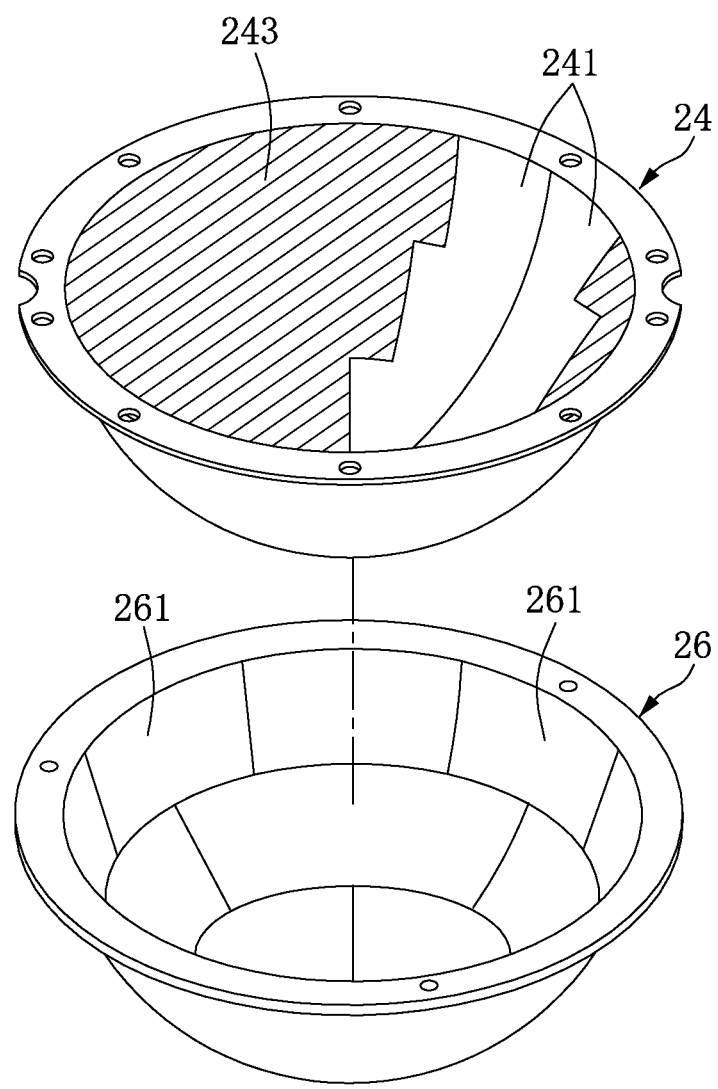
FIG. 13 is a perspective view showing a positioning member and a focusing member of the infrared sensing apparatus according to a fourth embodiment of the instant disclosure.

Please refer to the FIG. 13, which shows a fourth embodiment of the instant disclosure. The fourth embodiment is similar to the third embodiment, so the same features are not disclosed again. The main different feature of the two embodiments is the target positioning portion 241 in the instant embodiment is a hollow or a transparent construction and the surrounding portion 243 in the instant embodiment is a semi-transparent construction, and the different feature is disclosed as follows.

An infrared signal can be entirely transmitted into the infrared sensor 21 through any one of the condensing portions 261 and the target positioning portion 241 by using a hollow or a transparent target positioning portion 241. Moreover, the surrounding portion 243 is provided with a semi-transparent construction for causing a signal strength defined by an infrared signal transmitted into the infrared sensor 21 through the target positioning portion 241 and one of the condensing portions 261 to be larger than a signal strength defined by an infrared signal transmitted into the infrared sensor 21 through the surrounding portion 243 and one of the condensing portions 261.

Thus, in practical use, when an external heat source 200 enters into the scanning area S of the infrared sensing apparatus 100 of the instant embodiment, an infrared signal received by the infrared sensor 21 has a smaller signal strength if the infrared signal passes through the surrounding portion 243, but the controlling device 1 can be operated to recognize the smaller signal strength for rotating the positioning member 24, and the controlling device 1 can be operated to track the external heat source 200 by using the target positioning portion 241.

In addition, the advantage of the instant embodiment includes: the infrared sensing apparatus 100 can be operated to precisely judge a plurality of azimuthal angles of external heat sources 200 or can be operated to further detect the strength of each external heat source 200. Specifically, the infrared sensing apparatus 100 can be operated to judge an azimuthal angle of an external heat source, which is in a static mode or a moving mode, or the infrared sensing apparatus 100 can be operated to judge strength of an external heat source 200 according to amplitude of an infrared signal emitted from the external heat source 200.

In the above embodiments, the infrared signal transmitted into the infrared sensor 21 needs to pass through the positioning member 24, and the positioning member 24 is provided with the target positioning portion 241 for tracking and positioning an external heat source 200. Moreover, the positioning member 24 is also provided with the surrounding portion 243 in the third and fourth embodiments, the condensing segment 2431 in the second embodiment, or the condensing portion 242 in the first embodiment so as to transmit an infrared signal, which is emitted from an external heat source 200 that exists in the scanning area S, into the infrared sensor 21 and then to start the judgment of the infrared sensing apparatus 100 of the step (c). In practical use, the infrared sensing apparatus 100 can be provided with a detecting member 32 electrically connected to the controlling device 1. The detecting member 32 is configured to achieve a specific detecting condition (e.g., detecting angle) for preventing a misjudgment from occurring, thereby precisely detecting whether an external heat source 200 enters into the scanning area S or not. A detecting medium of the detecting member 32 can be infrared light, ultrasound, or visible light, but is not limited thereto.

[Fifth Embodiment]

Figure 14:
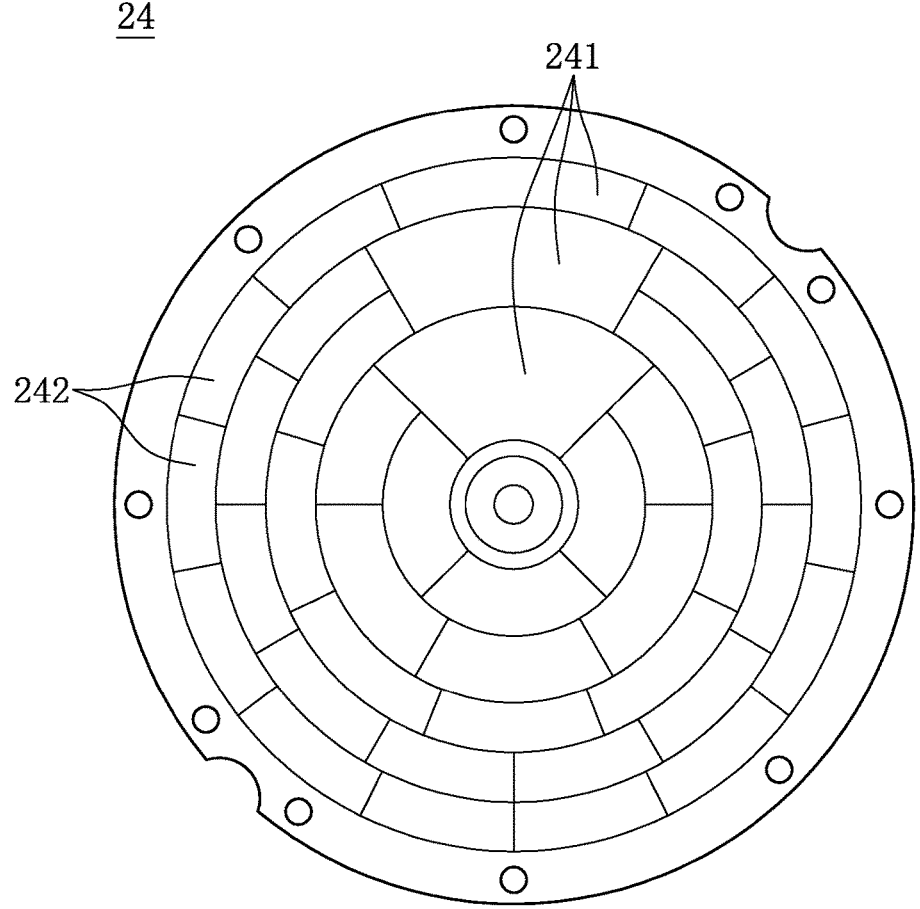
FIG. 14 is a top view showing a positioning member of the infrared sensing apparatus according to a fifth embodiment of the instant disclosure.

Please refer to the FIG. 14, which shows a fifth embodiment of the instant disclosure. The fifth embodiment is similar to the third embodiment, so the same features are not disclosed again. The main different feature of the two embodiments is the positioning member 24, and the different feature is disclosed as follows.

The positioning member 24 in the instant embodiment has a target positioning portion 241 and a plurality of condensing portions 242 arranged around the target positioning portion 241. The target positioning portion 241 consists of a plurality of convex lens arranged side by side, and each condensing portion 242 is a convex lens. Moreover, the size of each condensing portion 242 is smaller than the size of each convex lens of the target positioning portion 241, the condensing portions 242 are assembled to be a plurality of stacked C-shaped constructions, and the ends of the C-shaped constructions are connected to two opposite edges of the target positioning portion 241. The number of convex lens of each C-shaped construction is greater than the number of convex lens of the target positioning portion 241.

Accordingly, the positioning member 24 in the instant embodiment is provided for causing a signal strength defined by an infrared signal transmitted into the infrared sensor 21 through the target positioning portion 241 to be greater than a signal strength defined by an infrared signal transmitted into the infrared sensor 21 through any one of the condensing portion 242.

[The Possible Effect of the Instant Disclosure]

In summary, the infrared sensing apparatus and the method of the instant disclosure are provided to rapidly obtain an azimuthal angle of an external heat source at a time point by using the infrared sensor to receive the infrared signals, which are emitted from the external heat source with two kinds of signal strengths, and by using the cooperation of the aligning member and the target positioning portion.

Moreover, the updated situation disclosed in the step (a), which is obtained by only a single infrared sensor, is provided to be a reference for judging that an external heat source enters into or leaves out of the scanning area of the infrared sensing apparatus, so if an external heat source exists in the scanning area, the infrared sensing apparatus can rapidly know. Accordingly, the infrared sensing apparatus and the method of the instant disclosure can be used to detect an azimuthal angle of a static heat source or a movable heat source and further be used to emit a signal to stop an external device, such as lamp, electric fan, or alarm voice, and so on.

The hemispherical positioning member of the instant disclosure is provided to guide an external infrared signal to focus on the detecting surface of the infrared sensor if any external infrared signal passes through the positioning member, thus the infrared sensor can have a broader receiving area by cooperating with the hemispherical positioning member, and the hemispherical positioning member is provided without affecting the appearance of infrared sensing apparatus.

In addition, the infrared sensing apparatus and the method of the instant disclosure can be operated without rotating the infrared sensor for decreasing noise, which is generated from signal transmission. The infrared sensing apparatus can be provided with the bearing arranged between on the infrared sensor and the turntable to reduce friction of the turntable, thereby reducing energy waste from driving the infrared sensing apparatus, increasing stability of the infrared sensor for receiving an infrared signal, and effectively increasing the using life of the infrared sensing apparatus.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. An apparatus for detecting an azimuthal angle of a heat source, comprising:
   a controlling device, comprising:
     a circuit board;
     a micro-controller electrically connected to the circuit board; and
     a driving module electrically connected to the circuit board, wherein the driving module is electrically connected to the micro-controller via the circuit board; and
   a detecting device, comprising:
     a turntable connected to the driving module;
     a reference member disposed on the turntable;
     a positioning member installed on the turntable and having a target positioning portion, wherein the driving module is configured to drive the positioning member to rotate along an axis;
     an infrared sensor electrically connected to the circuit board for receiving an infrared signal transmitted into the detecting device through the positioning member, wherein a signal strength defined by an infrared signal transmitted into the infrared sensor through the target positioning portion of the positioning member is different from a signal strength defined by an infrared signal transmitted into the infrared sensor through another portion of the positioning member; and
     an aligning member electrically connected to the controlling device, wherein the aligning member and the reference member co-define a starting time reference when the target positioning portion starts to rotate;
   wherein the positioning member further has a plurality of condensing portions arranged around the target positioning portion, the target positioning portion has a plurality of convex lenses arranged side by side, and each condensing portion is a convex lens, the size of each condensing portion is smaller than the size of each convex lens of the target positioning portion, the condensing portions are assembled to be a plurality of stacked C-shaped constructions, and the ends of the C-shaped constructions are connected to two opposite edges of the target positioning portion, and the number of convex lenses of each C-shaped construction is greater than the number of convex lenses of the target positioning portion.

2. The apparatus as claimed in claim 1, further comprising a detecting member, the apparatus defining a scanning area, wherein the controlling device is electrically connected to the detecting member for detecting whether an external heat source enters into or leaves out the scanning area.

3. The apparatus as claimed in claim 1, further comprising a case, wherein the case has a direction label for arranging a detecting direction of the apparatus during an installation of the apparatus.

4. A method for detecting an azimuthal angle of a heat source, comprising:
   providing an infrared sensing apparatus, wherein the infrared sensing apparatus comprises a controlling device and a detecting device electrically connected to the controlling device, the detecting device comprises:
     a target positioning portion which is rotatable along an axis;
     an infrared sensor; and
     an aligning member electrically connected to the controlling device, wherein the aligning member defines a starting time reference when the target positioning portion starts to rotate;
   implementing a plurality of detecting steps by using the infrared sensing apparatus, wherein the detecting steps comprise:
   (a) operating the controlling device to detect a unit period (Tc) by using the aligning member, wherein the infrared sensing apparatus is operated to record a situation of a transient heat source in a scanning area; and then operating the controlling device to order the target positioning portion to stop and to align with the aligning member, wherein the unit period is defined by rotating the target positioning portion through one circle;
   (b) operating the infrared sensing apparatus to scan the scanning area, wherein the infrared sensing apparatus is operated to update the situation of the transient heat source in the scanning area without rotating the target positioning portion, wherein if a distribution of the signal strength received by the infrared sensing apparatus is different from the update situation of the transient heat source, the controlling device judges that an external heat source has entered into the scanning area;

(c) when the external heat source entering into the scanning area is detected by the infrared sensing apparatus, operating the controlling device to drive the target positioning portion to rotate, and making a judgment of the infrared sensing apparatus corresponding to the position of the external heat source, the judgement comprising:

defining a plane perpendicular to the axis as an azimuthal plane, wherein the axis is a central axis of the azimuthal plane, wherein at the azimuthal plane, the aligning member is orthogonally projected onto the azimuthal plane to define an initial azimuthal position, the axis and the initial azimuthal position co-define a first line connected there-between, and the first line is defined as 0° of the azimuthal plane;

defining a time point (Ts) of the external heat source by mapping a particular time to the unit period, wherein an infrared signal emitted from the external heat source is transmitted into the infrared sensor through the target positioning portion at the particular time;

defining a heat source position by orthogonally projecting the target positioning portion onto the azimuthal plane at the time point, wherein in the azimuthal plane, the axis and the heat source position co-define a second line connected there-between; and defining an angle between the first line and the second line as an azimuthal angle (⊖x) of the external heat source, wherein the azimuthal angle is obtained by using the controlling device to calculate an equation: ⊖x=(Ts/Tc)×360°; and (d) when the fact that the external heat source has left out of the scanning area is detected by the infrared sensing apparatus, operating the controlling device to selectively order the target positioning portion to stop, and operating the controlling device to order the target positioning portion to align with the aligning member.

5. The method as claimed in claim 4, wherein in the detecting step (c), when the external heat source entering into the scanning area is detected by the infrared sensing apparatus, the controlling device is operated to selectively emit an electrical signal to control an external device.

6. The method as claimed in claim 4, wherein in the detecting step (c), when the azimuthal angle is obtained, the controlling device is operated to selectively emit an electrical signal to control an external device.

7. The method as claimed in claim 4, wherein in the detecting step (d), when the fact that the external heat source has left out of the scanning area is detected by the infrared sensing apparatus, the controlling device is operated to selectively emit an electrical signal to control an external device.

8. The method as claimed in claim 4, wherein in the detecting steps (a)~(d), the target positioning portion continues to rotate after being driven.

9. The method as claimed in claim 4, wherein in the detecting step (a), the infrared sensor is operated to receive a plurality of clocks when the target positioning portion is rotated through one circle, each clock is defined by an external signal being transmitted into the infrared sensor through the target positioning portion, the number of the clocks is R and is defined as the unit period; in the detecting step (c), the time point of the external heat source is a Qth clock of the clocks, and the equation becomes: ⊖x=(Q/R)×360°.

* * * * *